United States Patent
Sundermann

(10) Patent No.: US 10,488,296 B2
(45) Date of Patent: Nov. 26, 2019

(54) METHOD OF DETERMINING STRESS VARIATIONS OVER TIME IN AN UNDERSEA PIPE FOR TRANSPORTING FLUIDS

(71) Applicant: SAIPEM S.A., Montigny le Bretonneux (FR)

(72) Inventor: Axel Sundermann, Fontenay-les-Briis (FR)

(73) Assignee: Saipem S.A., Montigny le Bretonneux (FR)

( * ) Notice: Subject to any disclaimer, the term of this patent is extended or adjusted under 35 U.S.C. 154(b) by 0 days.

(21) Appl. No.: 16/117,515

(22) Filed: Aug. 30, 2018

(65) Prior Publication Data

US 2019/0064030 A1 Feb. 28, 2019

(30) Foreign Application Priority Data

Aug. 31, 2017 (FR) ...................... 17 58047

(51) Int. Cl.
| | |
|---|---|
| *G01M 5/00* | (2006.01) |
| *G01L 11/02* | (2006.01) |
| *G01K 11/32* | (2006.01) |
| *G01M 11/08* | (2006.01) |
| *G01D 5/353* | (2006.01) |
| *G01L 1/24* | (2006.01) |

(52) U.S. Cl.
CPC ...... *G01M 5/0091* (2013.01); *G01D 5/35361* (2013.01); *G01K 11/32* (2013.01); *G01L 1/242* (2013.01); *G01L 11/025* (2013.01); *G01M 5/0041* (2013.01); *G01M 11/085* (2013.01)

(58) Field of Classification Search
CPC .......................... G01M 5/0091; G01M 5/085; G01D 5/35361; G01K 11/32; G01L 1/242; G01L 11/025
See application file for complete search history.

(56) References Cited

U.S. PATENT DOCUMENTS

| | | | | |
|---|---|---|---|---|
| 2006/0165344 A1* | 7/2006 | Mendez | ................. | E21B 47/06 385/13 |
| 2014/0025319 A1* | 1/2014 | Farhadiroushan | ...... | G01S 5/186 702/56 |
| 2015/0308909 A1* | 10/2015 | Carneal | ............... | G01M 5/0025 250/206 |

(Continued)

FOREIGN PATENT DOCUMENTS

| | | |
|---|---|---|
| FR | 3 047 308 | 8/2017 |
| FR | 3 047 309 | 8/2017 |
| WO | WO 2014/013244 | 1/2014 |

*Primary Examiner* — Dominic J Bologna
(74) *Attorney, Agent, or Firm* — Cozen O'Connor

(57) ABSTRACT

A method of determining stress variations over time in an undersea pipe for transporting fluids, the method comprising: installing along the entire length of the pipe (1) at least one distributed optical fiber sensor (2-1 to 2-4) using Rayleigh backscattering, the sensor being dedicated to measuring at least one degree of freedom of movement variation over time in the pipe at each cross section of the pipe; continuously measuring movement variation of the optical fiber sensor over time; and determining stress variations over time at each point in the pipe by time integration of the measured movement variation of the optical fiber sensor.

13 Claims, 1 Drawing Sheet

(56) References Cited

U.S. PATENT DOCUMENTS

| | | | |
|---|---|---|---|
| 2016/0161350 A1* | 6/2016 | Balasubramaniam | ....................... G02B 6/022 73/800 |
| 2016/0169807 A1* | 6/2016 | Uno | ....................... G01K 1/143 356/73.1 |
| 2016/0202133 A1* | 7/2016 | Francois | ................ G01B 11/18 250/227.14 |
| 2017/0167949 A1* | 6/2017 | Xia | ....................... E21B 47/123 |
| 2017/0260848 A1* | 9/2017 | Xia | ........................... G01V 1/40 |
| 2018/0087999 A1* | 3/2018 | Carmona | ............ G01M 5/0058 |

\* cited by examiner

METHOD OF DETERMINING STRESS VARIATIONS OVER TIME IN AN UNDERSEA PIPE FOR TRANSPORTING FLUIDS

BACKGROUND OF THE INVENTION

1. Field of the Invention

The present invention relates to the general field of undersea fluid transport pipes that are subjected to deformation dynamically. The invention relates more particularly to pipes for transferring hydrocarbons, e.g. oil or gas, and providing a bottom-to-surface connection or a connection between two floating supports.

2. Description of the Related Art

Hydrocarbon transfer pipes used for providing connections between two floating supports or for providing bottom-to-surface connections, referred to herein as "risers", are typically made by continuously raising pipes that have previously been laid on the sea bottom, directly towards a floating support, e.g. by giving them a catenary configuration.

Pipes that are raised from the bottom in this way in order to form risers need to be made out of flexible pipes when the depth of water is less than the few hundreds of meters. Nevertheless, once the depth of water reaches or exceeds 800 meters (m) to 1000 m, flexible pipes are replaced by rigid pipes made up of unit length pipe elements that are made out of a strong material, such as thick steel, and that are welded together. Rigid risers made out of strong material, and in a catenary configuration, are commonly referred to as "steel catenary risers" (SCRs).

Such pipes providing bottom-to-surface connections or connections between two floating supports are subjected over time to dynamic stress variations, and those variations need to be monitored in order to avoid any risk of major damage to the pipes, or indeed any risk of the pipes rupturing. In practice, operators in the offshore oil industry calculate the lifetimes of their undersea installations, and in particular of their pipes providing bottom-to-surface connections or connections between two floating supports, on the basis of oceanographic data taken from the location where the oilfield is situated. Determining the stress variations in such undersea pipes makes it possible to calculate the deformations and the movements of a pipe, its fatigue state, and to obtain a measure of the stress undulations due to vibration induced by vortices becoming detached (known as "vortex induced vibration" or (VIV)).

Those calculations are generally pessimistic in order to minimize risk-taking, and for safety reasons installations are usually declared to be at risk well before they are genuinely at risk. Furthermore, those calculations are subjected to audits in compliance with standards that contain safety factors. By using such standards, an operator can submit a file for certification to an inspection organization in order to provide a guarantee with the competent authorities.

Also known are both publication FR 3 047 308, which describes a method of monitoring the thermomechanical behavior of an undersea pipe for transporting fluid under pressure, and also publication FR 3 047 309, which describes a method and a device for monitoring the mechanical behavior of an undersea pipe for transporting fluid under pressure, both of those methods making use of optical fiber sensors.

Also known is publication US 2016/0161350, which describes a method of monitoring a pipe by using an optical fiber disposed helically around the pipe with a plurality of Bragg grating sensors placed in the optical fiber. That installation makes it possible at each Bragg grating sensor to measure any deformation of the pipe (in bending, twisting, etc.). One of the drawbacks of that monitoring method is that measurements are limited to the positions where the Bragg grating sensors are located, and so it is possible only to sample the deformation of the pipe, but not to measure it over the entire length of the pipe.

Also known is publication WO 2014/013244, which describes a method of monitoring the position of a structure by using a distributed optical fiber sensor together with a plurality of acoustic emitters deployed at known positions in the vicinity of the monitored structure. That method determines an acoustic field, and on the basis of the known positions of the acoustic emitters, it deduces therefrom the movements of the structure. Such a method presents the main drawback of being complex to implement, in particular because the correspondence between the acoustic field that is obtained and the movements of the structure is not direct.

SUMMARY OF THE INVENTION

A main object of the present invention is to propose a method of dynamically monitoring the deformation of an undersea pipe without presenting the above-mentioned drawbacks.

In accordance with the invention, this object is achieved by a method of determining stress variations over time in a fluid transport undersea pipe providing a bottom-to-surface connection or a connection between two floating supports, the stress variations being suitable for deducing the movements, the deformations, the fatigue, and the vortex induced vibration of the pipe, the method comprising:

installing along the entire length of the pipe at least one distributed optical fiber sensor using Rayleigh backscattering, the sensor being dedicated to measuring at least one degree of freedom of movement variation over time of the pipe in each cross section of the pipe;

continuously measuring the movement variation of the optical fiber sensor over time; and determining stress variations over time at each point of the pipe by time integration of the measured movement variation of the optical fiber sensor on the basis of the following matrix relationship:

$$\partial_t \vec{\epsilon}(s) = A(s) \partial_t \vec{x}(s)$$

in which:

s is the curvilinear abscissa of the fiber;

$\partial_t \vec{\epsilon}(s)$ is a vector of dimension 1 to 6, in which the components correspond to the time derivatives of the respective axial local deformations of the optical fiber sensors;

$\partial_t \vec{x}(s)$ is a vector having the same dimension as $\partial_t \vec{\epsilon}(s)$ representing the time derivatives of the deformation reduction elements at the center of gravity of the structure section corresponding to the curvilinear abscissa s for measuring on the pipe; and A(s) is a deformation matrix that is a function of the local positions and angular orientations of the optical fiber sensors on the pipe, of the curvilinear abscissa s, and of the mechanical and geometrical properties of the structure, the optical fiber sensors being installed in such a manner that the deformation matrix A(s) is invertible.

The method of the invention makes provision for using optical fiber sensors as a multitude of strain gauges and for having recourse to distributed acoustic sensing (DAS) technology for measuring variation in the axial deformation of the optical fibers. This technology makes it possible to analyze the variations in optical refractive indices along with the optical fiber sensors by analyzing light reflected by Rayleigh reflection (which variations may be due both to variations in temperature and also to variations in stress in the core of the optical fiber). By using calculations similar to those of beam theory giving the relationships between the axial deformations of the optical fiber sensors and the deformations at each point of the pipe, it becomes possible in real time to determine dynamically the movements, the deformations, the fatigue state, and the vortex induced vibration of the pipe. In particular, the method of the invention makes it possible to have a direct correspondence between the variations in optical refractive indices along the optical fiber sensors and the deformations of the pipe. Furthermore, the deformations of the pipe are measured along the entire length of the pipe, and not only at certain portions of the pipe.

Thus, the invention is remarkable in that it combines installing optical fiber sensors directly on the pipe both with measuring stress variations over time at each point of the pipe by using DAS technology, and also with calculating the movements, the deformations, the fatigue state, and the vortex induced vibration at all points along the pipe.

In the offshore oil industry, dynamically measuring deformation in pipes that provide a bottom-to-surface connection or a connection between two floating supports, and thus measuring fatigue along the pipes, enables operators to monitor structural integrity, and consequently to extend considerably the lifetimes of such pipes with an acceptable level of risk, thereby enabling significant savings to be achieved. These measurements also make it possible to locate the appearance of cracks in undersea structures due to the fatigue phenomenon resulting from dynamic stresses, thus making it possible to take action in anticipated manner and thereby preserve installations for as long as possible.

Preferably, the distributed optical fiber sensors are installed helically around the pipe. Installing the optical fiber sensors helically presents the advantage of providing them with better mechanical adhesion on the pipe.

Alternatively, the distributed optical fiber sensors may be installed in straight lines around the pipe.

The method may also include installing at least two additional distributed optical fiber sensors along the entire length of the pipe in order to improve the accuracy with which stresses are determined at each point of the pipe. The presence of these optical fiber sensors makes it possible for calculations concerning the dynamic deformations of the pipe to be performed more accurately and more rigorously.

The method may comprise installing along the entire length of the pipe at least four distributed optical fiber sensors dedicated to measuring three degrees of freedom in rotation simultaneously with measuring one degree of freedom in movement of the pipe at each cross section of the pipe.

The method may further comprise installing along the entire length of the pipe an optical fiber pressure sensor for measuring pressure in the pipe. Under such circumstances, the optical fiber pressure sensor may be arranged in a straight line parallel to the longitudinal axis of the pipe or helically around the pipe.

The method may further comprise installing along the entire length of the pipe an optical fiber temperature sensor for measuring temperature in the pipe.

Also preferably, the method further comprises determining the movements over time at each point of the pipe by time and spatial integration of the measured movement variation of the optical fiber sensor situated on the section corresponding to the point of the pipe.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Other characteristics and advantages of the present invention appear from the following description made with reference to the accompanying drawing, which shows implementations having no limiting character. In the figures.

DETAILED DESCRIPTION OF THE PRESENTLY PREFERRED EMBODIMENTS

Figure 1:
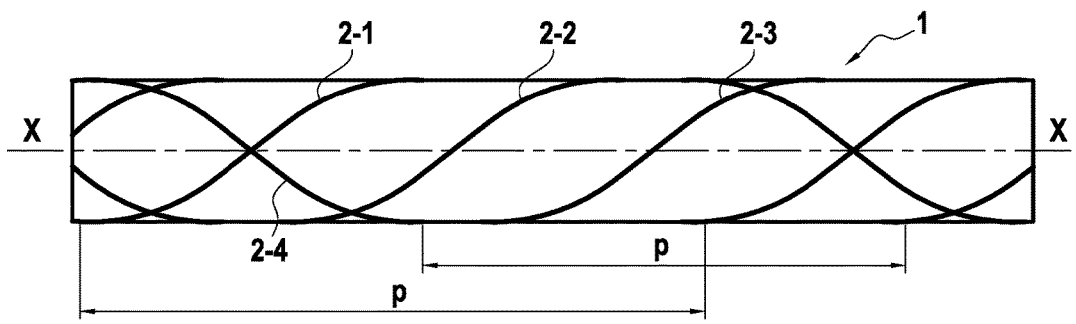
FIG. 1 is a diagram showing a pipe fitted with optical fiber sensors for performing the method in a first implementation of the invention.

The invention applies to any undersea pipe (single walled or double walled) for transporting fluid, in particular oil and gas, and for providing a bottom-to-surface connection or a connection between two floating supports, such as the pipe 1 shown in part and diagrammatically in FIG. 1.

The method of the invention proposes determining stress variations over time in such a pipe, i.e. quantifying the deformations to which the pipe is subjected at all points of the pipe and in real time.

Once the stress variations have been obtained, it is possible, in known manner, to deduce therefrom the fatigue state of the pipe over time, the deformations to which the pipe is subjected over time (by time integration of the stress variations), the movements of the pipe over time (by both time and spatial integration of the stress variations), and the vortex induced vibration (VIV).

For this purpose, according to the invention, provision is made to install at least one distributed optical fiber sensor around the pipe and over its entire length, the sensor making use of Rayleigh backscattering.

Each of the various distributed optical fiber sensors is used as a distributed acoustic detection sensor. The sensors are preferably monomode fibers, but they could be multimode fibers.

Each distributed optical fiber sensor is dedicated to measuring one degree of freedom in movement variation over time in the pipe in each of its cross sections, selected from the following four degrees of freedom: two degrees in bending, one degree in twisting, and one degree in axial movement (i.e. axial compression or tension).

In the majority of configurations, it is necessary to place four distributed optical fiber sensors around the pipe in order to avoid measuring combinations (sums or differences) of the various degrees of freedom. In contrast, when it is known in advance that the pipe is to be subjected to only one degree of freedom, then only one optical fiber sensor is necessary.

Once the distributed optical fiber sensors have been installed around the pipe, movement variation of the optical fiber sensor over time is measured continuously using known distributed acoustic detection technology, which technology is applied in this example at low frequency (i.e. in the range 0.01 hertz (Hz) to 1 Hz).

Distributed acoustic detection technology makes it possible to analyze variations in optical refractive indices along the optical fiber sensors by analyzing light reflected by Rayleigh reflection. Such variations in optical refractive indices may be due to variations in temperature and to variations in stresses in the cores of the optical fibers. The very high speed of light thus makes it possible to detect stress variations that are very rapid, going up to the ultrasound range, and thus to detect ambient soundwaves. In the context of the present invention, use is made only of low frequencies, which correspond to the frequencies of waves at sea and to the frequencies at which vortices become detached (typically in the range 0.01 Hz to 1 Hz).

The stress variations over time at each point in the pipe are then determined by using the following matrix relationship:

$$\partial_t \vec{\in}(s) = A(s) \partial_t \vec{x}(s)$$

in which:
- $\partial_t \vec{\in}(s)$ is a vector of dimension 1 to 6, in which the components correspond to the time derivatives of the respective axial local deformations of the optical fiber sensors;
- $\partial_t \vec{x}(s)$ is a vector having the same dimension as $\partial_t \vec{\in}(s)$ representing the time derivatives of the deformation reduction elements at the center of gravity G of the structure section S corresponding to the curvilinear abscissa s of the measurement optical fiber on the pipe; and
- A(s) is a square "deformation" matrix that is a function of the local positions and angular orientations of the optical fiber sensors on the pipe, of the curvilinear abscissa s, of the geometry of the pipe, and of its mechanical characteristics.

In order to obtain the stress variations, it is necessary for the optical fiber sensors to be installed around the pipe in such a manner that the deformation matrix A(s) is invertible.

Various configurations for installing the optical fiber sensors can be envisaged in order to ensure that the deformation matrix A is invertible.

Figure 3:
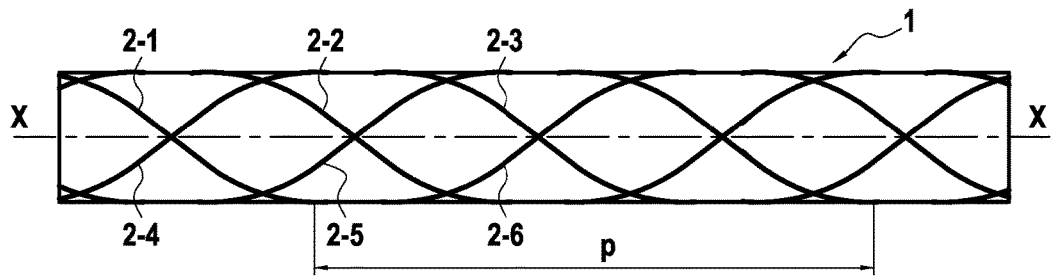
FIG. 3 is a diagram showing a pipe fitted with optical fiber sensors for performing the method in a third implementation of the invention.
Figure 4:
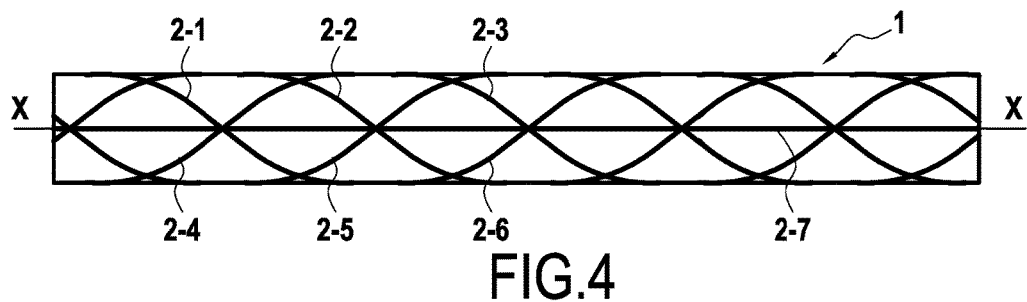
FIG. 4 is a diagram showing a pipe fitted with optical fiber sensors for performing the method in a fourth implementation of the invention.

FIGS. 1 and 4 show nonlimiting examples of installations for which the deformation matrix A(s) is invertible. Naturally, the person skilled in the art could envisage configurations other than those described below with reference to FIGS. 1 to 4.

For a given configuration of optical fiber sensor positioning, there exists only one deformation matrix A(s) that relates the deformations of the optical fiber to the deformations of the structure. The positioning of an optical fiber sensor on the structure determines a row vector of the deformation matrix A (if $\underline{x}$ and $\grave{o}$ are column vectors). For structures of tube type and for optical fiber sensors placed helically or straight on the tube, the row vectors of the corresponding deformation matrix A are given below. For a given fiber configuration and depending on the reduction elements of the deformation torsor that it is desired to determine, the deformation matrix A might or might not be invertible.

General Situation:

Consideration is given to a tube having an outside radius r with optical fiber sensors numbered 1, 2, . . . arranged thereon either in straight lines or else in helices around the tube. In order to describe the positions of the various fibers on the tube, the following parameters are introduced:
- α is given by the relationship α=p/2 π where p is the pitch of the helix of the optical fiber sensors. For a straight fiber, this parameter has the value +infinity.
- φ represents the angular position of each optical fiber sensor on the pipe section at curvilinear abscissa zero;
- ψ is a variable of value ±1 and describes the direction of rotation of the helix of each optical fiber sensor around the pipe; and
- s is the curvilinear abscissa associated with the fiber.

The position of a fiber in the Fresnel reference frame (G, $\vec{T}, \vec{N}, \vec{B}$) is then given by the following relationship:

$$f(s) = \begin{pmatrix} \dfrac{\alpha s}{\sqrt{r^2 + \alpha^2}} \\ r\cos\left(\psi \dfrac{s}{\sqrt{r^2 + \alpha^2}} + \phi\right) \\ r\sin\left(\psi \dfrac{s}{\sqrt{r^2 + \alpha^2}} + \phi\right) \end{pmatrix}_{\vec{T},\vec{N},\vec{B}}$$

For a straight fiber, the following applies:

$$f(s) = \begin{pmatrix} s \\ r\cos(\phi) \\ r\sin(\phi) \end{pmatrix}_{\vec{T},\vec{N},\vec{B}}$$

In order to describe the deformations of the tube and of the fiber, the following parameters are introduced, all of which depend on the curvilinear abscissa:
- $\in_1, \in_2, \ldots$ represent the axial deformations of the respective optical fibers 1, 2, . . . ; and
- the six degrees of freedom to move of the structure at each point of the structure are described by the torsor of the deformations and of its deformation reduction elements, by a deformation vector $\vec{e}$, and by a rotation gradient $\vec{k}$. These elements are written as a function of a movement vector of the center of gravity of the section S(s): $\vec{u}$ of components $u_1$, $u_2$, and $u_3$, and a rotation vector of the section S applied to the point G of S: $\vec{r}$ of components $r_1$, $r_2$, and $r_3$.

Derivatives relative to the curvilinear abscissa of a magnitude g are written g'.

It is established that the axial deformation of a helical fiber on a tube at each point of the tube as a function of the components of the above-defined movement and rotation vectors of the tube is written as the scalar product of two vectors. One of the vectors, $\vec{x}$, depends on the six degrees of freedom of movement of the tube, and the other vector, $A_i$, depends on the geometrical characteristics of the fiber and on the tube's Lamé coefficients, $\lambda$ and $\mu$:

$$A_i = \begin{pmatrix} \frac{1}{r^2+\alpha_i^2}\left(\alpha_i^2 - \frac{r^2\lambda}{2(\lambda+\mu)}\right) \\ \frac{-r\alpha_i\psi_i\sin\left(\psi_i\frac{s}{\sqrt{r^2+\alpha_i^2}}+\phi_i\right)}{r^2+\alpha_i^2} \\ \frac{r\alpha_i\psi_i\cos\left(\psi_i\frac{s}{\sqrt{r^2+\alpha_i^2}}+\phi_i\right)}{r^2+\alpha_i^2} \\ \psi_i \times \frac{\alpha_i r^2}{r^2+\alpha_i^2} \\ \frac{r\sin\left(\psi_i\frac{s}{\sqrt{r^2+\alpha_i^2}}+\phi_i\right)}{r^2+\alpha_i^2}\left(\alpha_i^2 - \frac{r^2\lambda}{2(\lambda+\mu)}\right) \\ \frac{-r\cos\left(\psi_i\frac{s}{\sqrt{r^2+\alpha_i^2}}+\phi_i\right)}{r^2+\alpha_i^2}\left(\alpha_i^2 - \frac{r^2\lambda}{2(\lambda+\mu)}\right) \end{pmatrix}$$

$$\vec{x} = \begin{pmatrix} u_1' \\ u_2' - r_3 \\ u_3' + r_2 \\ r_1' \\ r_2' \\ r_3' \end{pmatrix}$$

$$\epsilon_i = A_i \vec{x}$$

The vector $\vec{x}$ is thus equal to the spatial derivative of the movement vector of the center of gravity of the section $S(s)$, i.e. the following applies: $\vec{x} = \partial_s \vec{u}$ Knowing $\partial_t \vec{\in}(s)$ by measuring the time derivatives of the axial local deformations of the optical fiber sensors, and knowing $A$, it is possible by inverting the matrix $A$ to obtain $\partial_t \vec{x}(s)$, which is integrated relative to time. Thereafter, by spatial integration (relative to $\underline{s}$), the movement vector of the center of gravity of the section $S(s)$ is obtained.

In the special case of a straight fiber:

$$A_i = \begin{pmatrix} 1 \\ 0 \\ 0 \\ 0 \\ r\sin(\phi_i) \\ -r\cos(\phi_i) \end{pmatrix}$$

This technique makes it possible, at each curvilinear abscissa, to establish a matrix relationship between the deformation of the tube and the deformation of the fibers on the tube.

$$\vec{\in} = A \cdot \vec{x}$$

The matrix $A$ does not depend on time. It is thus also possible to write:

$$\partial_t \vec{\in} = A \cdot \partial_t \vec{x}$$

This relationship is important since $\partial_t \vec{\in}$ is the magnitude measured by the fibers.

The row vectors of the deformation matrix $A$ are the vectors $A_i$.

By appropriately selecting the arrangement of the optical fiber sensors on the tube, it is possible to ensure that the deformation matrix $A$ is invertible.

In practice, on rigid structures, it is possible to use the approximation concerning the rotations of sections whereby it is assumed that the components 2 and 3 of the vector $\vec{x}$ are zero. Under such circumstances, the matrix is reduced to dimension 4 and the implementation below gives an example for which the deformation matrix $A$ remains invertible. Conversely, if four fibers are selected, all having the same helical pitch, then the deformation matrix $A$ is not invertible.

In the particular situation in which it is known that the tube is subjected to only one type of force, e.g. traction, the deformation matrix can be reduced to the corresponding scalar.

Measuring the time derivatives of the axial deformation of the optical fibers thus makes it possible, at each point of the tube, to determine all of the components of the time derivative of the deformation of the tube, and then, by integration, to determine the movements, the positions, or the time derivatives of the stress torsor, and then, by integrating the torsor, to determine the stresses. Since measurement is performed at all points and in real time, it is also possible to access magnitudes such as damage to the structure and thus fatigue.

A Particular Implementation:

In a first embodiment shown in FIG. 1, the distributed optical fiber sensors 2-1 to 2-4 are advantageously arranged helically around the longitudinal axis X-X of the pipe 1, thereby improving their mechanical adhesion on the pipe.

In this embodiment, the optical fiber sensors 2-1 to 2-3 are positioned helically at the same pitch $\underline{p}$, and the respective initial angular positions of those helices are offset from one another by $2\pi/3$. The fourth optical fiber sensor 2-4 is positioned helically with the same pitch $\underline{p}$ but in the opposite direction to the optical fiber sensors 2-1 to 2-3, and starting from an arbitrary initial angular position.

In practice, with this helical configuration, in order to determine the stress and fatigue states of the pipe at all points of the pipe, it is necessary to know the helical positions of the optical fiber sensors 2-1 to 2-4, which positions are described by using the curvilinear abscissa given by the following equation (already mentioned above):

$$f(s) = \begin{pmatrix} \frac{\alpha s}{\sqrt{r^2+\alpha^2}} \\ r\cos\left(\psi\frac{s}{\sqrt{r^2+\alpha^2}}+\phi\right) \\ r\sin\left(\psi\frac{s}{\sqrt{r^2+\alpha^2}}+\phi\right) \end{pmatrix}_{\vec{T},\vec{N},\vec{B}}$$

Still with the FIG. 1 helical configuration, the relationship between the respective angular and axial deformations $\in_1$, $\in_2$, $\in_3$, and $\in_4$ of the fiber sensors 2-1 to 2-4 and the deformations at each point of the pipe is given, as mentioned above, by the matrix relationship:

$$\vec{\epsilon} = A\vec{x}$$

in which:

$$A = (a_{ij})_{1 \leq i, j \leq 4}$$

$$\vec{\epsilon} = \begin{pmatrix} \epsilon_1 \\ \epsilon_2 \\ \epsilon_3 \\ \epsilon_4 \end{pmatrix}, \text{ and } \vec{x} = \begin{pmatrix} u'_1 \\ r'_1 \\ r'_2 \\ r'_3 \end{pmatrix}$$

$$a_{i1} = \frac{1}{r^2 + \alpha_i^2}\left(\alpha_i^2 - \frac{r^2\lambda}{2(\lambda+\mu)}\right)$$

$$a_{i2} = \frac{\psi_i \alpha_i r^2}{r^2 + \alpha_i^2}$$

$$a_{i3} = \frac{r\sin\left(\frac{\psi_i s}{\sqrt{r^2+\alpha_i^2}} + \phi_i\right)}{r^2 + \alpha_i^2}\left(\alpha_i^2 - \frac{r^2\lambda}{2(\lambda+\mu)}\right)$$

$$a_{i4} = \frac{-r\cos\left(\frac{\psi_i s}{\sqrt{r^2+\alpha_i^2}} + \phi_i\right)}{r^2 + \alpha_i^2}\left(\alpha_i^2 - \frac{r^2\lambda}{2(\lambda+\mu)}\right)$$

Thus, for the configuration of the first embodiment of FIG. 1, and on the basis of knowledge of the measured time derivatives $\partial_t\vec{\epsilon}$ of the axial deformations of the optical fibers, it is possible to determine the looked-for components of deformation variations $\partial_t\vec{x}$ and forces. Furthermore, integrating these movement vectors makes it possible step-by-step to obtain the position of each element of the pipe, and thus the stress and fatigue state of the pipe in real time.

It should be observed that this example relies on the approximation whereby the movement states of the pipe along axes perpendicular to the generator line of the pipe are negligible, which makes it possible to work with the assumption that $u'_2-r_3=0$ and $u'_3+r_2=0$ (thereby simplifying calculation by reducing its order). It is thus possible to obtain the stress variations with knowledge only of component 1 of the movement vector and of the three components of the rotation vector.

Figure 2:
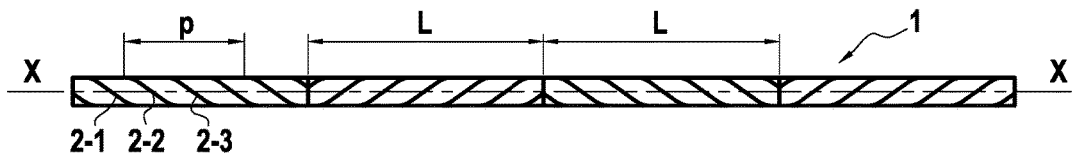
FIG. 2 is a diagram showing a pipe fitted with optical fiber sensors for performing the method in a second implementation of the invention.

In a second embodiment shown in FIG. 2, which also makes it possible to obtain an invertible deformation matrix A, three optical fiber sensors 2-1 to 2-3 are positioned helically with the same pitch p and with the respective initial angular positions of those helices being offset from one another by $2\pi/3$, as in the first embodiment. Furthermore, the direction of the helices is changed at regular intervals (e.g. once every L meters along the pipe). In order to determine the stress and fatigue state of the pipe, it is assumed in this example that the measurements are the same over two consecutive pipe sections, which makes it possible to obtain an approximation that is good enough for pipes that are very long (several kilometers) when L is selected to be small compared with the characteristic length of stress variation within the structure.

Compared with the first embodiment, this installation presents the advantage of avoiding any overlap of the optical fiber sensors. In contrast, its spatial resolution is limited to 2L (instead of to L for the first embodiment). Naturally, in this example also, the deformation matrix A is invertible, which makes it possible to determine the stress and fatigue state of the pipe in real time.

In a third embodiment, it is possible to measure the deformation elements $u'_2-r_3=0$ and $u'_3+r_2=0$ by adding two additional optical fiber sensors 2-5 and 2-6.

The configuration shown in FIG. 3 is an example making it possible to measure the deformation elements $u'_2-r_3$ and $u'_3+r_2$.

In this embodiment, the three optical fiber sensors 2-1 to 2-3 are positioned around the longitudinal axis X-X of the pipe in helices having the same pitch p, and with the respective initial angular positions of these helices being offset from one another by $2\pi/3$. The other three optical fiber sensors 2-4 to 2-6 are likewise positioned helically with the same pitch 2 and with the same offset for their initial angular positions, however they are in the opposite direction compared with the optical fiber sensors 2-1 to 2-3.

In this embodiment, the deformation matrix A is a 6×6 matrix that is invertible, which makes it possible by means of the above-mentioned calculations to determine the stress and fatigue state of the pipe in real time.

FIG. 4 shows a fourth embodiment of the invention, likewise making it possible to obtain a deformation matrix A that is invertible. In this example, there are seven optical fiber sensors that are positioned identically to the sensors of the third embodiment together with an additional optical fiber sensor that is straight (i.e. the three optical fiber sensors 2-1 to 2-3 are positioned helically around the longitudinal axis X-X of the pipe 1 in one direction and the three optical fiber sensors 2-4 to 2-6 are positioned helically in the opposite direction).

This fourth embodiment differs from the preceding embodiment in that the installation has an optical fiber pressure sensor 2-7 for measuring pressure inside the pipe. In this example, the pressure optical fiber sensor 2-7 is positioned in a straight line, i.e. parallel to the longitudinal axis X-X of the pipe. Thus, the optical fiber pressure sensor is insensitive to the pipe swelling under pressure and is subjected only to the elongation of the pipe under pressure. It thus makes it possible by taking the difference to obtain the pressure inside the pipe dynamically, and thus to determine the portion of the deformation that is due to internal pressure.

It should be observed that this optical fiber pressure sensor could alternatively be arranged helically around the pipe at a pitch different from the pitch of the optical fiber sensors 2-1 to 2-6.

It should also be observed that this optical fiber pressure sensor could be added to the first embodiment described with reference to FIG. 1.

It should also be observed that it is possible in each of the above-described embodiments to measure temperature along with the pipe in order to determine the deformation that is due to temperature variations along the pipe. For this purpose, an optical fiber temperature sensor may be added beside one of the distributed optical fiber sensors, the optical fiber temperature sensor being interrogated by a distributed temperature sensing (DTS) system and the distributed optical fiber sensor being interrogated by a distributed acoustic detection system.

It should also be observed that in each of the above described embodiments it is possible to add an additional optical fiber sensor beside each of the optical fiber sensors in order to obtain the static component of the deformation state of the pipe by using a Brillouin optical time domain reflectometry (BOTDR) system or a Brillouin optical time domain analysis (BOTDA) system. Such systems make it possible to obtain a mean deformation state over a period longer than one minute relative to a given reference state.

It should also be observed that in order to avoid using numerous distributed acoustic detection systems (i.e. one system per distributed optical fiber sensor), it is possible to position the distributed optical fiber sensors by connecting them to one another (the optical fiber sensor 2-1 being connected at one end of the pipe to the distributed acoustic detection system and at its opposite end to the optical fiber sensor 2-2, which is itself connected at its other end to the optical fiber sensor 2-3, etc.). Thus, in this example, only one distributed acoustic detection system is needed for interrogating all of the optical fiber sensors.

Finally, it should be observed that the distributed optical fiber sensors could be installed around the pipe in straight lines (i.e. parallel to its longitudinal axis X-X).

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of determining stress variations over time in a fluid transport undersea pipe and providing a bottom-to-surface connection or a connection between two floating supports, the stress variations being suitable for deducing the movements, the deformations, the fatigue, and the vortex induced vibration of the pipe, the method comprising:
   installing along the entire length of the pipe at least one distributed optical fiber sensor using Rayleigh backscattering, the sensor being dedicated to measuring at least one degree of freedom of movement variation over time of the pipe in each cross section of the pipe;
   continuously measuring the movement variation of the optical fiber sensor over time; and
   determining stress variations over time at each point of the pipe by time integration of the measured movement variation of the optical fiber sensor on the basis of the following matrix relationship:

$$\partial_t \vec{\in}(s) = A(s) \partial_t \vec{x}(s)$$

in which:
   $\underline{s}$ is the curvilinear abscissa of the fiber;
   $\partial_t \vec{\in}(s)$ is a vector of dimension 1 to 6, in which the components correspond to the time derivatives of the respective axial local deformations of the optical fiber sensors;

$\partial_t \vec{x}(s)$ is a vector having the same dimension as $\partial_t \vec{\in}(s)$ representing the time derivatives of the deformation reduction elements at the center of gravity of the structure section corresponding to the curvilinear abscissa $\underline{s}$ for measuring on the pipe; and
   $A(s)$ is a deformation matrix that is a function of the local positions and angular orientations of the optical fiber sensors on the pipe, of the curvilinear abscissa $\underline{s}$, and of the mechanical and geometrical properties of the structure, the optical fiber sensors being installed in such a manner that the deformation matrix $A(s)$ is invertible.

2. The method according to claim 1, wherein the distributed optical fiber sensors are installed helically around the pipe.

3. The method according to claim 1, wherein the distributed optical fiber sensors are installed in straight lines around the pipe.

4. The method according to claim 1, comprising installing along the entire length of the pipe at least four distributed optical fiber sensors dedicated to measuring three degrees of freedom in rotation simultaneously with measuring one degree of freedom in movement of the pipe at each cross section of the pipe.

5. The method according to claim 1, further comprising installing along the entire length of the pipe an optical fiber pressure sensor for measuring pressure in the pipe.

6. The method according to claim 5, wherein the optical fiber pressure sensor is arranged in a straight line parallel to the longitudinal axis (X-X) of the pipe or helically around the pipe.

7. The method according to claim 1, further comprising installing along the entire length of the pipe an optical fiber temperature sensor for measuring temperature in the pipe.

8. The method according to claim 1, further comprising determining the movements over time at each point of the pipe by time and spatial integration of the measured movement variation of the optical fiber sensor situated on the section corresponding to the point of the pipe.

9. The method according to claim 2, comprising installing along the entire length of the pipe at least four distributed optical fiber sensors dedicated to measuring three degrees of freedom in rotation simultaneously with measuring one degree of freedom in movement of the pipe at each cross section of the pipe.

10. The method according to claim 3, comprising installing along the entire length of the pipe at least four distributed optical fiber sensors dedicated to measuring three degrees of freedom in rotation simultaneously with measuring one degree of freedom in movement of the pipe at each cross section of the pipe.

11. The method according to claim 4, further comprising installing along the entire length of the pipe an optical fiber pressure sensor for measuring pressure in the pipe.

12. The method according to claim 6, further comprising installing along the entire length of the pipe an optical fiber temperature sensor for measuring temperature in the pipe.

13. The method according to claim 7, further comprising determining the movements over time at each point of the pipe by time and spatial integration of the measured movement variation of the optical fiber sensor situated on the section corresponding to the point of the pipe.

* * * * *